United States Patent [19]

Bishop

[11] Patent Number: 4,607,309

[45] Date of Patent: Aug. 19, 1986

[54] APPARATUS FOR DETECTING ARCING FAULTS ON LOW-VOLTAGE SPOT NETWORKS

[75] Inventor: Martin T. Bishop, Wilkins Twp., Allegheny County, Pa.

[73] Assignee: Westinghouse Electric Corp., Pittsburgh, Pa.

[21] Appl. No.: 610,540

[22] Filed: May 15, 1984

[51] Int. Cl.⁴ .............................................. H02H 7/00
[52] U.S. Cl. ........................................ 361/62; 361/63; 361/65; 324/51; 324/86; 324/108
[58] Field of Search ................. 361/62, 63, 65, 86, 361/87, 88, 90-92; 324/51, 86, 107-108

[56] References Cited

U.S. PATENT DOCUMENTS

| | | |
|---|---|---|
| 3,192,442 | 6/1962 | Warrington et al. ................ 324/86 |
| 3,970,897 | 7/1976 | Tamir et al. ........................... 361/78 |
| 4,333,050 | 1/1982 | Yeasting ............................... 324/107 |
| 4,409,636 | 10/1983 | Brandt et al. ......................... 361/87 |

*Primary Examiner*—A. D. Pellinen
*Assistant Examiner*—Jeffrey A. Gaffin
*Attorney, Agent, or Firm*—W. E. Zitelli

[57] ABSTRACT

A protective relay for detecting power arcing faults on a three-phase electrical power spot network. A phase-to-phase power arc on a spot network produces harmonics on the phase-to-phase voltages, and the phase currents; a phase-to-ground arc produces harmonics on the phase-to-neutral voltages. The protective relay of the present invention monitors one or more of the three phase-to-phase voltages, the three phase-to-neutral voltages, or the three phase currents and indicates a fault based on the harmonic content of those signals.

12 Claims, 3 Drawing Figures

APPARATUS FOR DETECTING ARCING FAULTS ON LOW-VOLTAGE SPOT NETWORKS

BACKGROUND OF THE INVENTION

1. Field of the Invention

This invention relates generally to an apparatus for detecting arcing faults, and more specifically, to such an apparatus for detecting arcing faults on low-voltage spot networks.

2. Description of the Prior Art

Low-voltage electrical power networks consist of interlaced loops or grid systems. Electrical energy is supplied to the network by two or more power sources, so that the loss of any one source does not result in an interruption of electrical service. These systems provide the highest level of reliability possible with conventional power distribution and are normally used to serve high-density load areas. Primary applications are in central or downtown city areas, large buildings, shopping centers, and some industrial plants. Network systems are of either the grid-type or spot-type. The electrical service is three-phase, three-wire or three-phase, four-wire at 208Y/120V or 480Y/277V.

In a grid system, the loads and sources form a grid pattern. Several sources, each usually employing a dedicated feeder, supply electrical power to the network. The source is connected to the network via a high voltage switch, a three-phase network transformer, and a network protector. The transformer secondary is usually 208Y/120V or 480Y/277V wye-connected, for three-phase, four-wire service to the network through the network protector. The network protector consists of an air circuit breaker, and normally a network master relay. When a source of supply or primary feeder is lost, the load formerly supplied by that feeder is carried by the remaining feeders.

Large concentrated load areas, such as commercial buildings and shopping centers, are frequently served by spot networks. Spot networks consist of two or more network units fed by two or more primary feeders. Typically, the spot network primary cables are tapped from non-dedicated feeders.

Typical low-voltage spot network installations operated at nominal 480Y/277V (line-to-line voltage grounded wye configuration) are not protected against network faults. Normally, a 480V bus is supplied by multiple transformer installations connected to two or more high-voltage primary circuits. Between the transformer and the 480V bus work is a network protector. The network protector isolates the transformer from the bus in the event of a fault in the transformer or the primary circuit feeding it. High reliability is achieved since primary faults are isolated and the network is carried by the other feeders connected to it.

The network protector also opens when a fault in the primary feeder would cause power flow from the network to the feeder, that is, reverse power flow. The network protector is not designed to open for faults on the network itself. In turn, fuses in the network are designed with a long time delay to act as back-up protection for the network protector for primary system faults. In addition, the master relay of the network protector opens the circuit breaker when the primary feeder is disconnected from its source of supply and magnetizing current flows from the secondary network into the network transformer. To summarize, the circuit breaker opens when the network transformer associated with it is not delivering power to the network, and when conditions are such that total three-phase power would flow from the network into the primary feeder. To protect against reverse power flow, the network master relay monitors total three-phase power direction. Typical spot network installations do not contain phase overcurrent or ground overcurrent protective relays or any form of overcurrent protection for the network, other than the fuses.

Phase-to-ground or phase-to-phase faults that start in the 480V bus work due to contamination, human error, etc. normally involve a power arc. The voltage produced across the arc can limit the fault current to values less than the rating of the network fuses in the bus work and can typically be on the order of the load current. Under such conditions, the network fuses will not open. However, these power arcs represent a tremendous concentration of energy at the point of the arc and the heat released represents a hazard and can destroy 480V bus work.

SUMMARY OF THE INVENTION

The present invention is a new protective relay designed to detect power arcs on spot networks and open all network protectors associated with the spot network, thereby extinguishing the power arc. To perform this function, the protective relay analyzes the harmonic distortion of the bus current or voltage. Oscillograms from staged arcing fault tests reveal that significant harmonic distortion of the phase-to-neutral voltage exists during a phase-to-ground power arcing fault. Harmonic distortion of the phase-to-phase and phase-to-neutral voltages also occurs during a phase-to-phase arcing fault. Harmonic distortion of the current in the faulted phase conductors also occurs.

BRIEF DESCRIPTION OF THE DRAWINGS

The invention may be better understood, and further advantages and uses thereof more readily apparent, when considered in view of the following detail description of exemplary embodiments, taken with the accompanying drawings in which.

DESCRIPTION OF THE PREFERRED EMBODIMENTS

Figure 1:
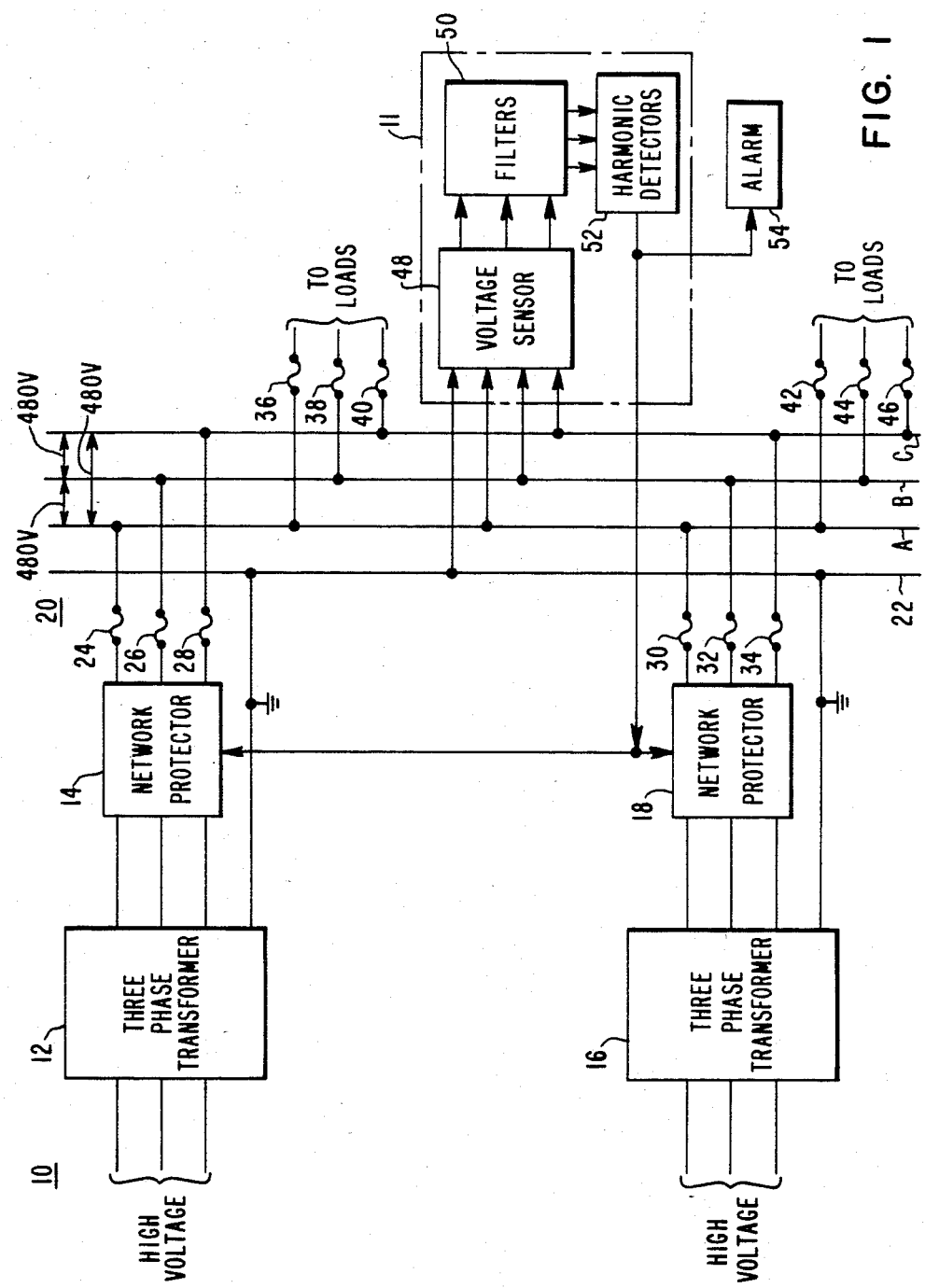
FIG. 1 is a block diagram of a low-voltage spot network including a first embodiment of a protective relay constructed according to the teachings of the present invention.

Turning to FIG. 1, there is shown a block diagram of a low-voltage spot network 10 including a protective relay 11 constructed according to the teachings of the present invention. A three-phase high voltage is input to the primary winding (not shown) of a three-phase transformer 12. A secondary winding of the three-phase transformer 12 is connected to phase A, B, and C conductors via a network protector 14 and fuses 24, 26, and 28, respectively. A bus 20 comprises the phase A, B, and C conductors and a neutral conductor 22. The three-phase transformer 12 is connected to the neutral conductor 22; the neutral conductor 22 is grounded at several points. As illustrated, there is a voltage of 480V between the phase A and B conductors, between the phase B and C conductors, and between the phase A and C conductors.

Another high voltage source supplies power to the primary winding (not shown) of a three-phase transformer 16 via phase A, B, and C conductors. The secondary of the three-phase transformer 16 is connected to an input side of the network protector 18; an output side of the network protector 18 is connected to the phase A, B, and C conductors via fuses 30, 32, and 34, respectively. A three-phase transformer 16 is also connected to the neutral conductor 22, which is grounded at several points. The bus 20 is connected to a plurality of loads, as indicated in FIG. 1. The phase A, B, and C conductors are connected to a first load via fuses 36, 38, and 40, respectively. The phase A, B, and C conductors are also connected to a second load via fuses 42, 44, and 46.

The protective relay 11 includes a voltage sensor 48 adapted for connection to the phase A, B, and C conductors and the neutral conductor 22. The voltage sensor 48 produces three voltage signals representative of the voltages between the phase A conductor and the neutral conductor 22, between the phase B conductor and the neutral conductor 22, and between the phase C conductor and the neutral conductor 22. The three signals from the voltage sensor 48 are input to filters 50. The filters 50 represent three individual filters, one each for the three signals from the voltage sensor 48. The filters 50 are of a high-pass nature allowing only the higher harmonics to pass through. These harmonics are present on the voltage signals when there is a phase-to-phase or phase-to-ground power arc on the bus 20. The three signals from the filters 50 are input to harmonic detectors 52. The harmonic detectors 52 represent three independent harmonic detectors for analyzing the harmonics in each of the three signals from the filters 50. When any of the three signals from the filters 50 reaches a predetermined magnitude, as determined by the design of the harmonic detectors 52, the harmonic detectors produce a signal for activating an alarm 54 and for opening the network protectors 14 and 18, thereby removing power from the bus 20 and extinguishing the arc.

The harmonic detectors 52 measure the total harmonic distortion (THD) associated with each of the three signals from the filters 50. Where:

$$\% \, THD = 100 \times \frac{\sqrt{V_2^2 + V_3^2 + V_4^2 + \ldots}}{V_1}$$

$V_i$ = RMS value of the ith harmonic

Although no universal standards exist, electric utilities may allow a THD of about 5% on their system. Therefore, in one embodiment of the present invention the harmonic detectors 50 are designed to indicate a fault when the THD is approximately 10% on any one of the three voltage signals developed by the voltage sensor 48. A THD of this magnitude would reveal a power arcing fault on the bus 20.

In a second embodiment (not shown) of the protective relay 11, the voltage sensor 48 can be connected to the phase A, B, and C conductors in such a manner as to provide three signals, representative of the voltage between the phase A and B conductors, between the phase A and C conductors, and between the phase B and C conductors. This embodiment is intended to detect phase-to-phase power arcs. Operation of the filters 50 and the harmonic detectors 52 is the same in both embodiments. For complete bus protection, a protection scheme should include both the first and second embodiments of the protective relay 11.

Figure 2:
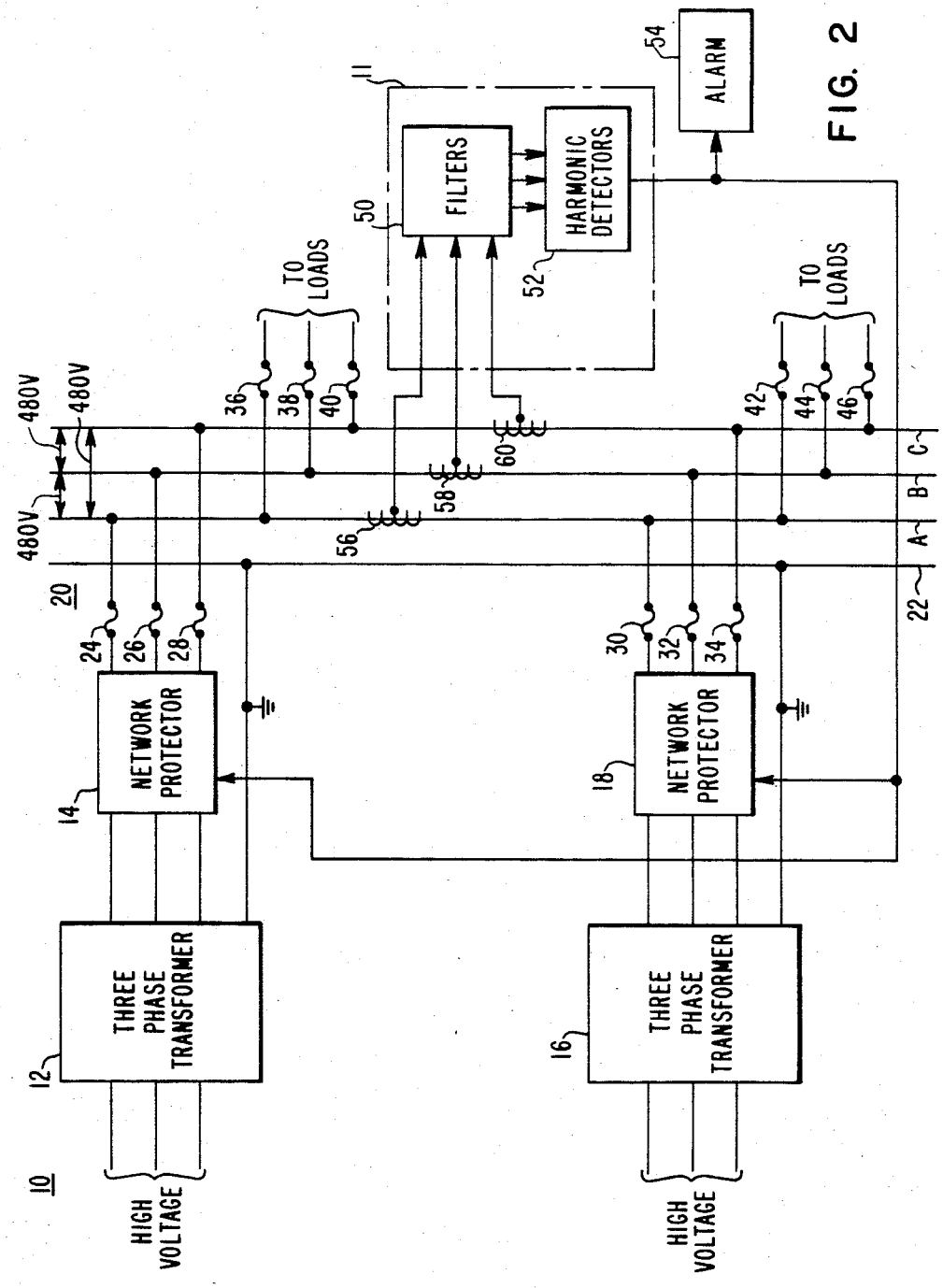
FIG. 2 is a block diagram of a low-voltage spot network including a third embodiment of a protective relay constructed according to the teachings of the present invention.

FIG. 2 is a block diagram of the low-voltage spot network 10 including a third embodiment for the protective relay 11. The components of FIG. 2 are identical in structure and function to the components bearing identical reference characters in FIG. 1. FIG. 2 includes a current transformer 56 for providing a signal representative of the current on the phase A conductor; a current transformer 58 for providing a signal representative of the current on the phase B conductor; and a current transformer 60 for providing a signal representative of the current on the phase C conductor. The signals from the current transformers 56, 58, and 60 are input to the filters 50. As in the FIG. 1 embodiment, the filters 50 represent three individual filters for filtering the signals input thereto. The filtered signals are input to the harmonic detectors 52 for detecting harmonics indicating the presence of a power arc on the bus 20. When a power arc occurs, the harmonic detectors 52 produce a signal to activate the alarm 54 and open the network protectors 14 and 18.

Figure 3:
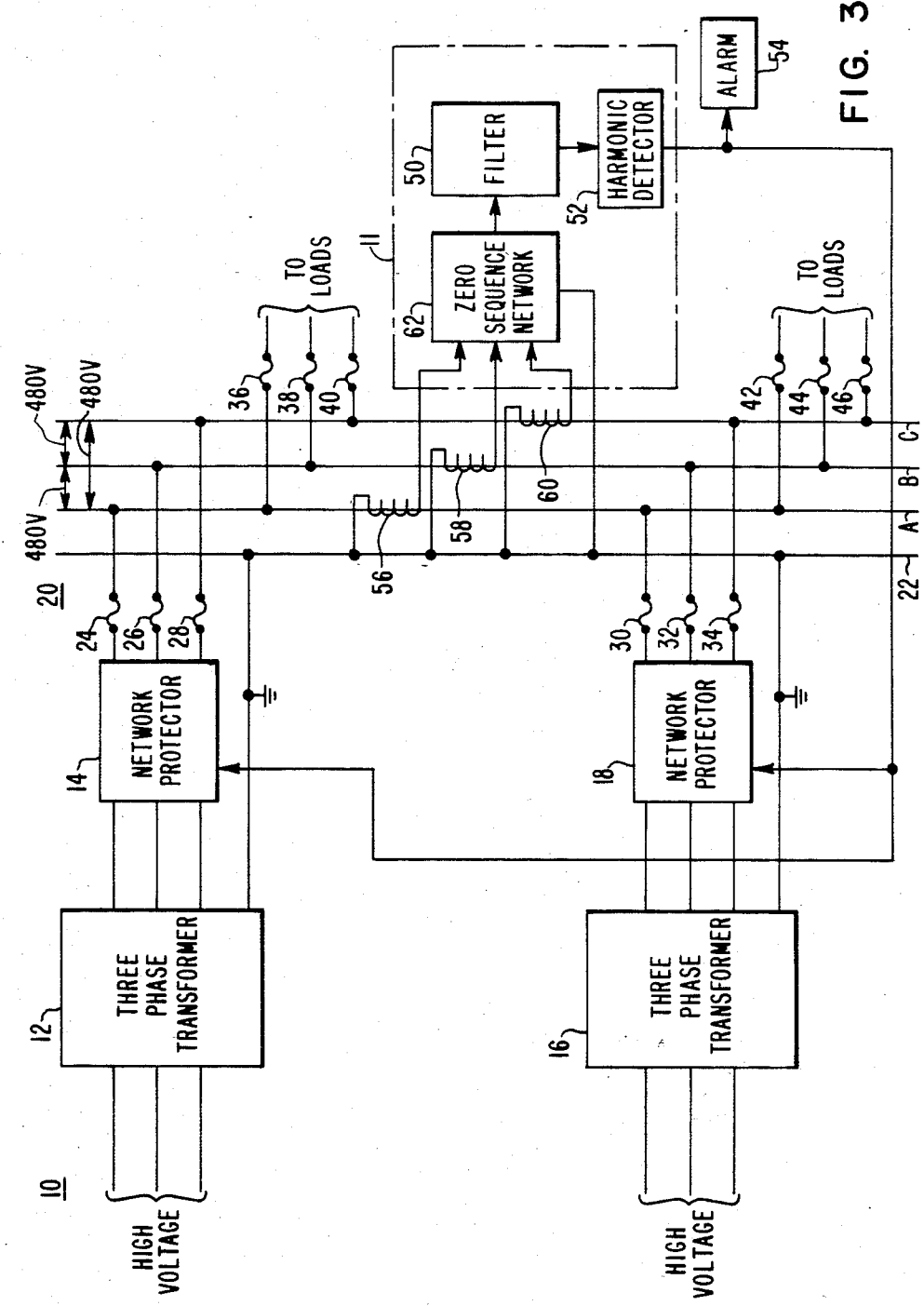
FIG. 3 is a block diagram of a low-voltage spot network including a fourth embodiment of a protective relay constructed according to the teachings of the present invention.

FIG. 3 is another block diagram of the low-voltage spot network 10 illustrating a fourth embodiment for the protective relay 11. The components of FIG. 3 are identical in structure and function to the components bearing identical reference characters in FIG. 1. The FIG. 3 embodiment includes the current transformers 56, 58, and 60, but in this embodiment the current transformers 56, 58, and 60 are connected such that the signals therefrom are input to a zero-sequence network 62 for producing a signal representative of the zero sequence current on the bus 20. The zero sequence current signal is input to the filter 50 for filtering, and then to the harmonic detector 52 for determining whether harmonics indicating the presence of a power arc are present in the current signals. If a power arc is detected, the harmonic detector 52 produces a signal for activating the alarm 54 and opening the network protectors 14 and 18.

In both the embodiments of FIGS. 2 and 3, for complete protection of the low-voltage spot network 10, a protective relay, similar in structure and function to the protective relay 11 (including the current transformers 56, 58 and 60) must be located at the low-voltage terminals of both the three-phase transformers 12 and 16. This avoids the possible occurrence of a fault down stream from the protective relay 11, such that the protective relay 11 could not detect the fault.

What is claimed is:

1. A protective relay for detecting power arc faults in an AC three-phase spot network including a bus having phase A, B, and C conductors, and a neutral conductor for distributing power to at least one load, a plurality of power sources for supplying power to said bus, and means for interrupting power to said bus from said plurality of power sources, said protective relay comprising:

means coupled to the phase A, B, and C conductors for generating a first voltage signal representative of the voltage between the phase A conductor and the neutral conductor, for generating a second voltage signal representative of the voltage between the phase B conductor and the neutral conductor, and for generating a third voltage signal representative of the voltages between the phase C conductor and the neutral conductor, each voltage signal representing its corresponding phase voltage fundamental frequency and all phase voltage harmonics thereof which are present on the corresponding phase conductor;

filter means for filtering said first, second, and third voltage signals to produce respectively first, second and third filtered signals, the content of each including only harmonic frequency components of its corresponding voltage signal;

and sensing means responsive to said first, second and third filtered signals for determining the total harmonic distortion of each based on a ratio of said harmonic frequency components of said corresponding filtered signal and the fundamental frequency component of said corresponding voltage signal, said sensing means further operative to indicate a fault when the total harmonic distortion of any one of said first, second, and third filtered signals reaches a predetermined value.

2. The protective relay of claim 1 wherein the predetermined value of the total harmonic distortion is approximately 10 percent.

3. The protective relay of claim 1 wherein the protective relay activates the power interrupting means when a fault is indicated.

4. A protective relay for detecting power arc faults in an AC three-phase spot network including a bus having phase A, B, and C conductors, and a neutral conductor for distributing power to at least one load, a plurality of power sources for supplying power to said bus, and means for interrupting power to said bus from said plurality of power sources, said protective relay comprising:

means coupled to the phase A, B, and C conductors and the neutral conductor, for generating a first voltage signal representative of the voltage difference between the phase A and B conductors, a second voltage signal representative of the voltage difference between the phase B and C conductors, and a third voltage signal representative of the voltage difference between the phase A and C conductors, each voltage signal representing its corresponding phase difference voltage fundamental frequency and all phase difference voltage harmonics thereof which are present on the corresponding phase conductors;

filter means for filtering said first, second and third voltage signals to produce respectively first, second, and third filtered signals the content of each including only harmonic frequency components of its corresponding voltage signal;

and sensing means responsive to said first, second, and third filtered signals for determining the total harmonic distortion of each based on a ratio of said harmonic frequency components of said corresponding filtered signal and the fundamental frequency component of said corresponding voltage signal, said sensing means further operative to indicate a fault when the total harmonic distortion of any one of said first, second, and third filtered signals reaches a predetermined value.

5. The protective relay of claim 4 wherein the predetermined value of the total harmonic distortion is approximately 10 percent.

6. The protective relay of claim 4 wherein the protective relay activates the power interrupters means when a fault is indicated.

7. A protective relay for detecting power arc faults in an AC three-phase electrical power spot network including a bus having A, B, and C conductors, and a neutral conductor for distributing power to at least one load, a plurality of power sources for supplying power to said bus and means for interrupting power to said bus from said plurality of power sources, said protective relay comprising:

first current transformer means located proximate to the phase A conductor for producing a first current signal representative of the current flowing on the phase A conductor;

second current transformer means located proximate to the phase B conductor for producing a second current signal representative of the current flowing on the phase B conductor;

third current transformer means located proximate to the phase C conductor for producing a third current signal representative of the current flowing on the phase C conductor;

said first, second and third current signals each representing its corresponding phase current fundamental frequency and all phase current harmonics thereof which are present on the corresponding phase conductor;

filter means for filtering said first, second, and third current signals to produce respectively first, second, and third filtered signals, the content of each including only harmonic frequency components of its corresponding current signal;

and sensing means responsive to said first, second, and third filtered signals for determining the total harmonic distortion of each of said first, second, and third filtered signals, each based on a ratio of said harmonic frequency components of said corresponding filtered signal and the fundamental frequency component of said corresponding current signal, said sensing means further operative to indicate a fault when the total harmonic distortion of any one of said first, second, and third filtered signals reaches a predetermined value.

8. The protective relay of claim 7 wherein the predetermined value of total harmonic distortion is approximately 10 percent.

9. The protective relay of claim 7 wherein the protective relay activates the power interrupting means when a fault is indicated.

10. A protective relay for detecting power arc faults in an AC three-phase electrical power spot network including a bus having phase A, B and C conductors, and a neutral conductor for distributing power to at least one load, a plurality of power sources for supplying power to said bus, and means for interrupting power to said bus from said plurality of power sources, said protective relay comprising:

means coupled to said bus for producing a signal representative of the zero-sequence current of said bus in the three-phase electrical power spot network, said zero-sequence current signal representing the fundamental frequency and all harmonics of the zero-sequence current present on said bus;

filter means for filtering said zero-sequence current signal to produce a filtered current signal the content of which including only harmonic frequency components of said zero-sequence current signal; and sensing means responsive to said filtered current signal for determining the total harmonic distortion thereof based on a ratio of said harmonic frequency components of said filtered current signal and the fundamental frequency component of said zero-sequence current signal, said sensing means further operative to indicate a fault when the total harmonic distortion reaches a predetermined value.

11. The protective relay of claim 10 wherein the predetermined value of the total harmonic distortion is approximately 10 percent.

12. The protective relay of claim 10 wherein the protective relay activates power interrupting means when a fault is indicated.

* * * * *